Feb. 9, 1932.  J. W. BATE  1,844,629
BALLOON TIRE JACK
Original Filed Oct. 15, 1927  2 Sheets-Sheet 1

Inventor:
John W. Bate,
By Dyrenforth, Lee, Chritton & Wiles
Attys.

Feb. 9, 1932.                J. W. BATE                1,844,629
                          BALLOON TIRE JACK
              Original Filed Oct. 15, 1927     2 Sheets-Sheet 2
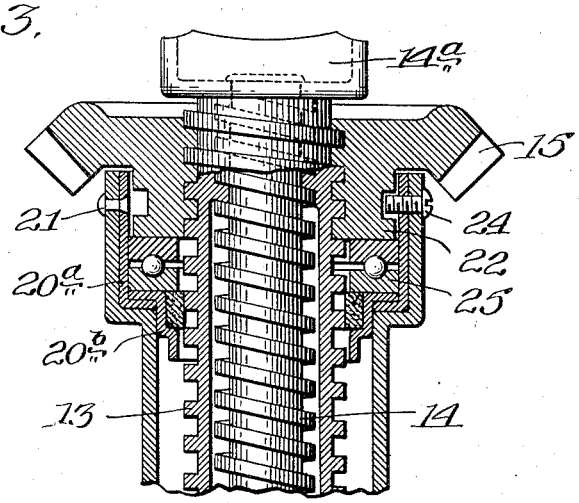
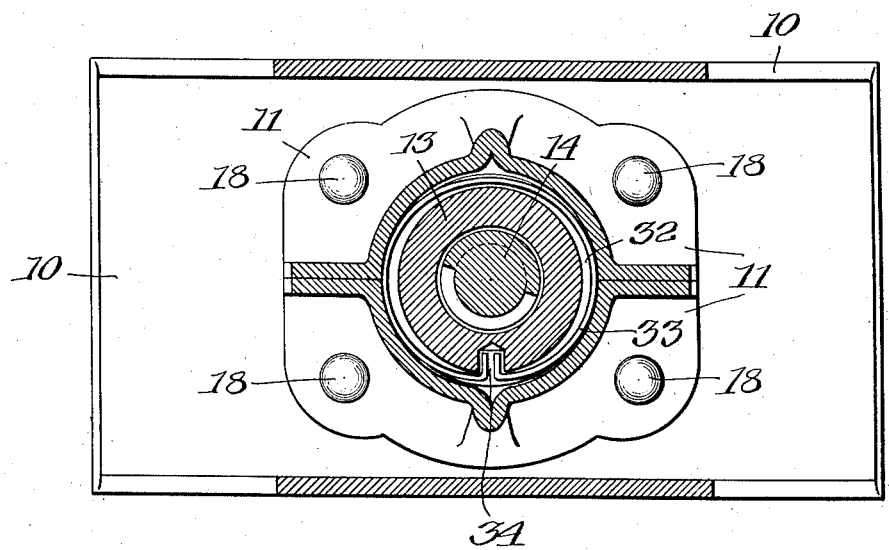

Patented Feb. 9, 1932

1,844,629

REISSUED

UNITED STATES PATENT OFFICE

JOHN W. BATE, OF RACINE, WISCONSIN, ASSIGNOR TO WALKER MANUFACTURING COMPANY, OF RACINE, WISCONSIN, A CORPORATION OF WISCONSIN

BALLOON TIRE JACK

Application filed October 15, 1927, Serial No. 226,874. Renewed December 4, 1931.

This invention relates to balloon tire jacks and the like.

An object of the invention is to provide a strong durable jack and one which at the same time can be manufactured economically.

This and other objects which will hereinafter appear are accomplished by this invention which is fully described in the following specification and shown in the accompanying drawings, in which:

Fig. 3 is a partial vertical section on the line 3—3 of Fig. 1 showing a modified form of the cup; and Fig. 4 is a section on the broken line 4—4 of Fig. 1.

Figure 1:
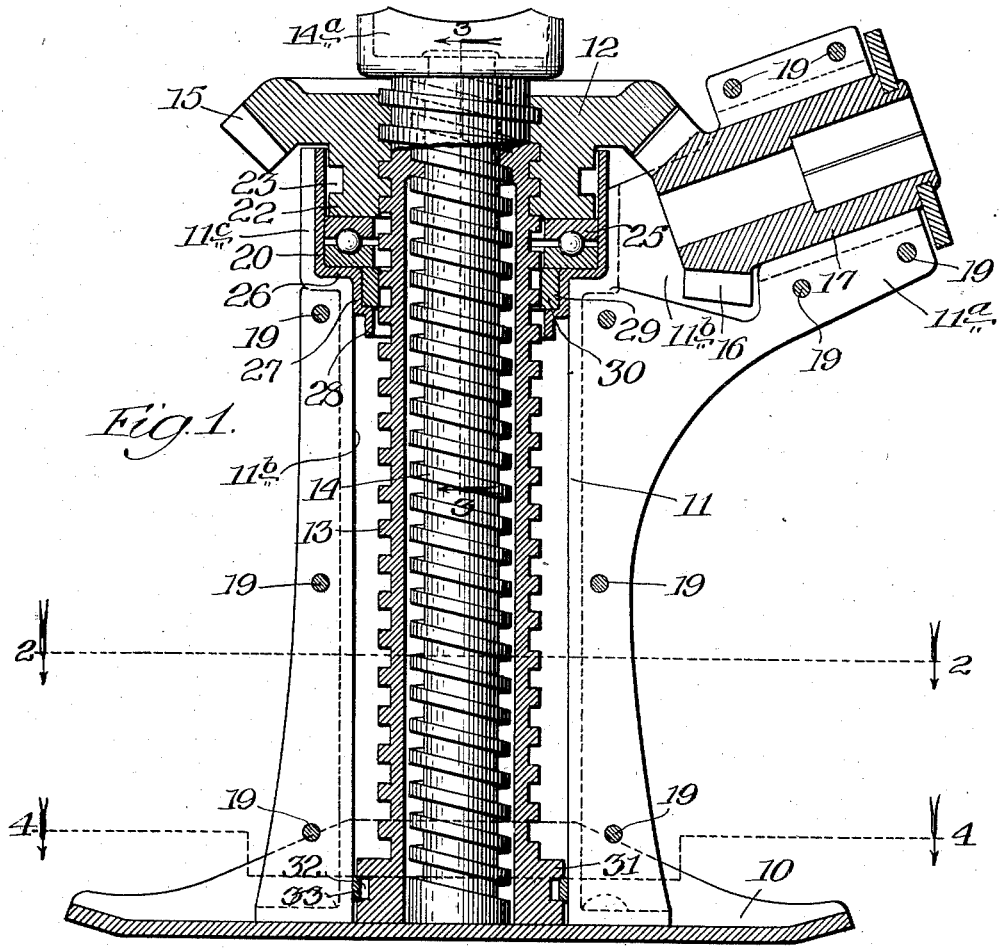
Figure 1 is a vertical section on the line 1—1 of Fig. 2.
Figure 2:
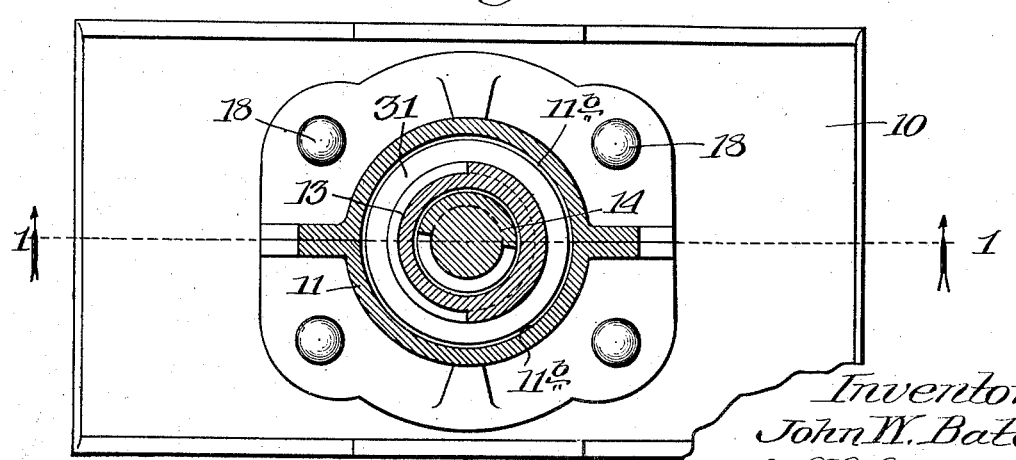
Fig. 2 is a horizontal section on the line 2—2 of Fig. 1.

The embodiment illustrated comprises a screw jack of the double lift type now commonly used on cars having balloon tires. This jack comprises a base 10, a housing 11, a nut 12 and outer and inner screw members 13 and 14 respectively. The nut 12 is provided on its periphery with a bevel gear 15 which meshes with a bevel pinion 16 on the shaft 17. An integral arm 11ª on the housing 11 provides a bearing for the shaft 17.

The base 10 and housing 11 are stepped or pressed from sheet metal, the housing 11 being secured to the base 10 by means of rivets 18 or the like. The housing 11 is made up of two substantially symmetrical sections which are secured together by a series of spot-welds 19.

The housing 11 is enlarged at 11ᵇ to partially enclose the bevel pinion 16. This housing has an enlarged portion 11ᶜ at the top which encloses a cup 20 which is preferably pressed or drawn from sheet metal. The cup 20 is secured to the enlarged portion 11ᶜ by means of a series of rivets 21 near the top. This serves also to stiffen the upper portion of the housing above the point where the spot-welds occur.

The nut 12 is provided on its lower face with a hub 22 in which is formed an annular groove 23 which is adapted to receive a screw 24 for preventing the removal of the nut.

The hub 22 rests upon a ball bearing 25, which in turn rests upon a shoulder 26 of the cup 20 which in turn rests upon a ledge forming the bottom of the enlarged portion 11ᶜ. The cup 20 is further stepped to provide a portion 27 which fits inside the central portion 11ᵇ of the housing, the cup 20 terminating in a reduced portion 28 which substantially fits the outer diameter of the outer screw member 13. Thus, an annular chamber or recess 29 is formed in which is placed a felt strip, ring or the like 30 which is adapted to receive and hold oil for lubricating the outer screw 13. Thus lubricating this outer screw enables it to turn more freely in the nut 12. The felt ring 30 also bears upon the screw 13 and provides some friction so as to prevent it from turning so readily with respect to the housing when the nut 12 is being turned. The friction thus produced by the felt ring 30 may be sufficient to hold the screw 13 so as to produce the necessary longitudinal movement to cause this screw to move up or down as the nut 12 is turned.

While the above friction means may be sufficient to add the friction necessary to raising and lowering the screw 13, I have also provided another and more effective means for accomplishing this same purpose if desired. This consists of an enlarged bottom 31 on the screw 13 which has an annular groove 32 therein in which is placed a flat spring member 33, the ends of which are bent and enter a hole 34 drilled in the side as shown in Fig. 4. Any desired amount of friction may thus be applied by putting in a spring 33 of the desired stiffness. The walls 11ᵇ are cylindrical and of the same diameter throughout so that the friction spring 33 will give about the same resistance at all points.

Thus it will be seen that when the nut 12 is turned to raise the jack, the two screw members 13 and 14 will move up until the cap 14ᵃ encounters the load to be lifted.

In Fig. 3 is shown a modified form of the device in which the cup 20 is made of two parts 20ª and 20ᵇ which have overlapping flanges.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a screw jack, a screw, a nut revoluble thereon and having a hub, a thrust bearing assembly beneath the hub, a pressed-metal housing having a longitudinal passage for said screw and an enlargement adapted to receive said hub and bearing a metal cup within such enlargement, a rotary shaft extending laterally from said nut for turning the same, said housing providing an integral bearing for said shaft.

2. In a screw jack, a screw, a nut revoluble thereon and having a hub, a thrust bearing assembly beneath the hub, a pressed-metal housing having a longitudinal passage for said screw and an enlargement adapted to receive said hub and bearing a metal cup within said enlargement, a rotary shaft extending laterally from said nut for turning the same, said housing being formed of two sections meeting on a longitudinal plane and secured together, said housing providing an integral bearing for said shaft.

3. In a screw jack, a screw, a nut revoluble thereon and having a hub, a thrust bearing assembly beneath the hub, a pressed-metal housing having a longitudinal passage for said screw and an enlargement adapted to receive said hub and bearing, a shaft extending laterally from said nut for turning the same, said housing providing an integral bearing for said shaft, and a pressed-metal cup within said enlargement and secured thereto, said cup surrounding said hub and thrust bearing.

4. In a screw jack, a screw, a nut revoluble thereon and having a hub, a thrust bearing assembly beneath the hub, a pressed-metal housing having a longitudinal passage for said screw and an enlargement adapted to receive said hub and bearing, a shaft extending laterally from said nut for turning the same, said housing being formed of two sections meeting on a longitudinal plane and secured together, said housing providing an integral bearing for said shaft, and a pressed-metal cup within said enlargement and secured thereto, said cup surrounding said hub and thrust bearing.

5. In a screw jack, a screw, a nut screwed thereon for raising and lowering the screw, means for turning said nut, a thrust bearing for taking the load on said nut, a metal cup around said screw and bearing, there being an annular space between said cup and screw, and a lubricant bearing material in said annular space.

6. In a screw jack, a screw, a nut screwed thereon for raising and lowering the screw, means for turning said nut, a thrust bearing for taking the load on said nut, a metal cup around said screw and bearing, there being an annular space between said cup and screw, and a lubricant bearing material in said annular space, said material tending also as a friction member to prevent rotation of said screw.

7. In a screw jack, a casing, a nut revolubly mounted in said casing, means for turning said nut, an outer screw threaded in said nut, an inner rotatable screw threaded in said outer screw, said outer screw having a base formed with an outer annular recess, a spring partially confined within the recess and encircling the base and frictionally engaging the casing.

8. In a screw jack, a casing, a nut revolubly mounted in said casing, means for turning said nut, an outer screw threaded in said nut, an inner rotatable screw threaded in said outer screw, said outer screw having a base provided with a depression, and a spring member encircling said base and frictionally engaging the casing and having a portion thereof embraced within said depression.

9. In a screw jack, a casing, a nut revolubly mounted in said casing, means for turning said nut, an outer screw threaded in said nut, said outer screw being provided at its base with a radial slot, an inner rotatable screw threaded in said outer screw, and a spring member looped about the base of said outer screw and frictionally engaging the casing having a portion thereof embraced within said slot.

10. In a screw jack, a screw having an exterior thread, a housing having a longitudinal passage for said screw and an enlargement near its upper end, a metal cup secured within said enlargement, a nut revolubly mounted in said cup and engaging said screw, and an oil swab surrounding said screw.

11. In a screw jack, in combination with a lifting screw, a nut revoluble thereon and having a depending hub, an anti-friction thrust bearing assembly surrounding the screw beneath the hub, and a rotary shaft extending laterally from the nut and having connections therewith to turn the nut, a casing comprising a sheet metal base plate and a plurality of sheet metal standard members adapted to be secured together and to the base plate and each formed to enclose a portion of an upright passage to receive the screw, an upper chamber to receive and support the nut and bearing assembly, and a bearing for the shaft.

12. In a screw jack, in combination with a lifting screw, a nut revoluble thereon and having a depending hub, an anti-friction thrust bearing assembly surrounding the screw beneath the hub, and a rotary shaft extending laterally from the nut and having connections therewith to turn the nut, a casing comprising a sheet metal base plate and a pair of similar sheet metal standard members adapted to be secured together and to the base plate and each formed to enclose a portion of an upright passage to receive the screw, an upper chamber to receive and support the nut and bearing assembly, and a bearing for the shaft.

13. In a screw jack, in combination with a lifting screw, a nut revoluble thereon and having a depending hub, an anti-friction thrust bearing assembly surrounding the screw beneath the hub, and a rotary shaft extending laterally from the nut and having connections therewith to turn the nut, a casing comprising a sheet metal base plate and a pair of similar sheet metal standard members adapted to be secured together and to the base plate and each formed to enclose one-half of an upright passage to receive the screw, an upper chamber to receive and support the nut and bearing assembly, and a bearing for the shaft.

14. In a screw jack, in combination with a lifting screw, a nut having a hub revoluble on the screw, a thrust-bearing assembly surrounding the screw beneath the hub, a rotary driving shaft extending laterally from the nut, and gear connections between the shaft and nut, a casing formed to provide a supporting base, an upright standard in which is an upright passage to receive the screw, an upper chamber to receive, support and partially enclose the nut and thrust bearing assembly and a bearing for the laterally extending shaft, the casing comprising a pair of sheet metal standard members adapted to be secured together, each of the members being formed to provide a portion of the upright passage, the upper chamber and the bearing.

15. In a screw jack, in combination with a lifting screw, a nut having a hub revoluble on the screw, a thrust-bearing assembly surrounding the screw beneath the hub, a rotary driving shaft extending laterally from the nut, and gear connections between the shaft and nut, a casing formed to provide a supporting base, an upright standard in which is an upright passage to receive the screw, an upper chamber to receive, support and partially enclose the nut and thrust-bearing assembly and a bearing for the laterally extending shaft, the casing comprising a pair of sheet metal standard members adapted to be secured together, each of the members being formed to provide substantially one-half of the upright passage, the upper chamber and the bearing.

16. In a screw jack, in combination with a lifting screw, a nut having a hub revoluble on the screw, a thrust-bearing assembly surrounding the screw beneath the hub, a rotary driving shaft extending laterally from the nut, and gear connections between the shaft and nut, a casing comprising a pair of sheet metal standard members adapted to be secured together and each formed to enclose a portion of an upright passage to receive the screw, a portion of an upper chamber which receives, supports and partially encloses the nut and thrust-bearing assembly, and a portion of a bearing for the laterally extending shaft.

In testimony whereof I have hereunto set my hand this 7th day of October, 1927.

JOHN W. BATE.